United States Patent [19]

Plouzennec et al.

[11] Patent Number: 5,168,150
[45] Date of Patent: Dec. 1, 1992

[54] DEVICE FOR THE PROCESSING OF A MAGNETIC-TRACK TICKET, ESPECIALLY AN AIR TRANSPORT TICKET

[75] Inventors: Thierry Plouzennec, Rueil-Malmaison; Bernard Bluteau, Chatenay-Malabry, both of France

[73] Assignee: Electronique Serge Dassault, France

[21] Appl. No.: 701,600

[22] Filed: May 13, 1991

Related U.S. Application Data

[63] Continuation of Ser. No. 346,391, May 2, 1989, abandoned.

[51] Int. Cl.[5] ............... G06K 13/00; B65H 20/00; G07B 15/02
[52] U.S. Cl. .................................. 235/475; 226/171; 235/384; 235/477
[58] Field of Search ............... 226/171; 235/477, 475, 235/476, 483, 484, 485, 384, 380

[56] References Cited

U.S. PATENT DOCUMENTS

| | | | |
|---|---|---|---|
| 3,556,274 | 1/1971 | Mizuta et al. | 194/210 |
| 3,580,121 | 5/1971 | Asada et al. | 83/107 |
| 3,825,950 | 7/1974 | Kobayashi | 360/109 |
| 3,874,650 | 4/1975 | Steigerwald et al. | 271/4 |
| 4,086,475 | 4/1978 | Churchill | 235/382 |
| 4,140,384 | 2/1979 | Shintani et al. | 226/171 |
| 4,167,664 | 9/1979 | Pass | 235/449 |
| 4,259,699 | 3/1981 | Yoshida | 360/2 |
| 4,288,688 | 9/1981 | Kiyama et al. | 235/475 |
| 4,357,530 | 11/1982 | Roes et al. | 235/384 |
| 4,918,298 | 4/1990 | Tanabe et al. | 235/384 |

FOREIGN PATENT DOCUMENTS

| | | |
|---|---|---|
| 1184658 | 3/1985 | Canada . |
| 2134891 | 2/1973 | Fed. Rep. of Germany . |
| 2338798 | 8/1977 | France . |
| 2566704 | 1/1986 | France . |
| 60-00232 | 7/1985 | Japan . |
| 60-225989 | 7/1985 | Japan . |

*Primary Examiner*—John W. Shepperd
*Assistant Examiner*—Christopher R. Glembocki
*Attorney, Agent, or Firm*—Christie, Parker & Hale

[57] ABSTRACT

The invention relates to a device for the processing a magnetic-track ticket, especially an air transport ticket, of the type comprising: an insertion station (G1, G2), a magnetic reading/writing station (19), an issuing station (G3, G4) and a belt (C1) wound in a closed circuit around rollers, one of which is a driving roller, and designed to drive the ticket along an internal path extending from the insertion station to the issuing station.

According to one characteristic of the invention, the ticket has weakening lines (16) corresponding to the cutout and division format of the portions of the ticket, the belt (C1) extends as far as a drum (T), about which the ticket issuing station (G4) and at least one additional ticket output interact, while a cutting-out station (20) is provided between the reading/writing station (19) and the drum (T), thus making it possible to direct the ticket portions that have been cutout towards the issuing station (30) or towards the additional output, depending on the content of the readable information on the said portions.

27 Claims, 3 Drawing Sheets

DEVICE FOR THE PROCESSING OF A MAGNETIC-TRACK TICKET, ESPECIALLY AN AIR TRANSPORT TICKET

CROSS-REFERENCE TO RELATED APPLICATIONS

This is a continuation of application Ser. No. 07/346,391, filed May 2, 1989 now abandoned.

FIELD OF THE INVENTION

The invention relates to the processing of a magnetic-track ticket, especially an air transport ticket.

BACKGROUND OF THE INVENTION

There are already known devices for the processing of a magnetic-track transport ticket, comprising a ticket insertion station, a magnetic ticket reading/writing station and a ticket issuing station. Means drive the ticket along an internal path extending from the insertion station to the issuing station. These drive means are defined at least partially by a belt wound in a closed circuit round rollers, one of which is a driving roller.

In general, such devices process magnetic-track transport tickets which, on a single portion, contain magnetic information relating to the said transport.

International air-transport organizations now require the transport ticket to comprise at least two detachable portions, of which the first, called the flight coupon, contains magnetic information relating to the commercial and financial characteristics of the transport service (which can involve several airline companies) and of which the second, called the boarding card, contains information relating to the boarding of the passenger.

The problem which the applicant faced was to provide a device for the processing of a magnetic-track ticket, especially a transport ticket comprising such flight-coupon and boarding-card portions.

SUMMARY OF THE INVENTION

The invention relates to a device for the processing of a magnetic-track ticket, especially an air transport ticket, of the type comprising:
- a ticket insertion station,
- a magnetic ticket reading/writing station,
- a ticket issuing station, and
- means designed to drive the ticket along an internal path extending from the insertion station to the issuing station, these drive means being at least partially defined by a belt wound in a closed circuit round rollers, one of which is a driving roller.

According to a first aspect of the invention, in combination,
- the said ticket has weakening lines corresponding to the cutout and division format of the portions of the ticket,
- the said closed-circuit belt is provided at the reading/writing station and extends as far as a drum, about which the ticket issuing station and at least one additional ticket output interact, the magnetic reading/writing taking place before the division of the portions of the ticket,
- whilst a cutting-out station is provided between the reading/writing station and the drum, thus making it possible to direct the ticket portions so cutout towards the issuing station or towards the additional output, depending on the content of the magnetic information readable on said portions.

Preferably, the additional output is coupled to at least one ticket storage receptacle, and the transport ticket comprises at least a first portion, called a boarding card, intended to be directed toward the issuing station, said first portion containing magnetic information relating to the boarding of the passenger, and a second portion, called a flight coupon, intended to be directed towards the storage receptacle, said second portion containing information relating to the commercial and financial characteristics of the transport service. In practice, the ticket storage receptacle is located inside the device.

Advantageously, the ticket storage receptacle is subdivided into two parts, each intended for receiving the portions of the ticket according to the content of the information readable on the said portions.

According to a preferred embodiment of the invention, the transport ticket of general rectangular form comprises a magnetic track extending longitudinally at a predetermined distance from one edge of the ticket.

According to another characteristic of the invention, the magnetic reading/writing station comprises, on one side, a magnetic reading/writing head mounted on a support arranged transversely relative to the internal path of the ticket, said support being fixed to a reference plate fastened parallel to the said path, the longitudinal edge of the ticket located at a predetermined distance from the magnetic track bearing on the said plate, whilst the reading head is located at said predetermined distance from the plate, to allow a correct reading of the magnetic track, and, on the other side, a roller mounted idly opposite the reading/writing head and interacting with said reading/writing head as a result of friction by means of an elastic return, in order to ensure that the ticket is pressed against the said head.

According to another preferred embodiment of the invention, the magnetic reading/writing station comprises, on one side, an additional magnetic reading/writing head mounted on a flexible frame arranged parallel to the internal path of the ticket, said frame being fixed to a flap mounted in a floating manner parallel to the reference plate, the longitudinal edge of the ticket located at a predetermined distance from the magnetic track bearing on the said flap, whilst the additional head is located at said predetermined distance from the flap, to allow a correct reading of the magnetic track, whatever the direction of insertion of the ticket, and, on the other side, an additional roller mounted idly opposite the additional reading/writing head and interacting with said additional head as a result of friction by means of an elastic return, in order to ensure that the ticket is pressed against the said additional head In practice, the ticket has a length of between 52 millimeters and 250 millimeters, and the rollers for driving the ticket are located at a distance substantially equal to 50 millimeters from one another, in order to drive a ticket having such a length.

According to another aspect of the invention, the cutting-out station comprises an electromagnetic guillotine controlled in conjunction with a detector of the portions of the ticket, the said electromagnetic guillotine comprising an electromagnet having a plunger equipped with a bracket supporting the cutting-out piece of the guillotine, the said bracket being mounted rotatably about an axle returned elastically, to allow the cutting-out station to extend horizontally, in order to ensure that the processing device according to the invention is compact.

In practice, the ticket-portion detector locates the predetermined weakening lines on the ticket.

According to another characteristic of the invention, switching means controlled in conjunction with the magnetic reading/writing station direct the portions of the ticket towards their respective output.

Advantageously, the belt is driven by a single motor of the stepping type, thus making it possible to contribute to making the device according to the invention compact.

DRAWINGS

Other characteristics and advantages of the invention will emerge from an examination of the following detailed description and of the accompanying drawings in which.

DETAILED DESCRIPTION

The accompanying drawings in many respects have elements of a particular nature. They must therefore be considered as an integral part of the description, and can serve not only to make it easier to understand the following detailed description, but also to complete the definition of the invention, where appropriate.

Figure 1:
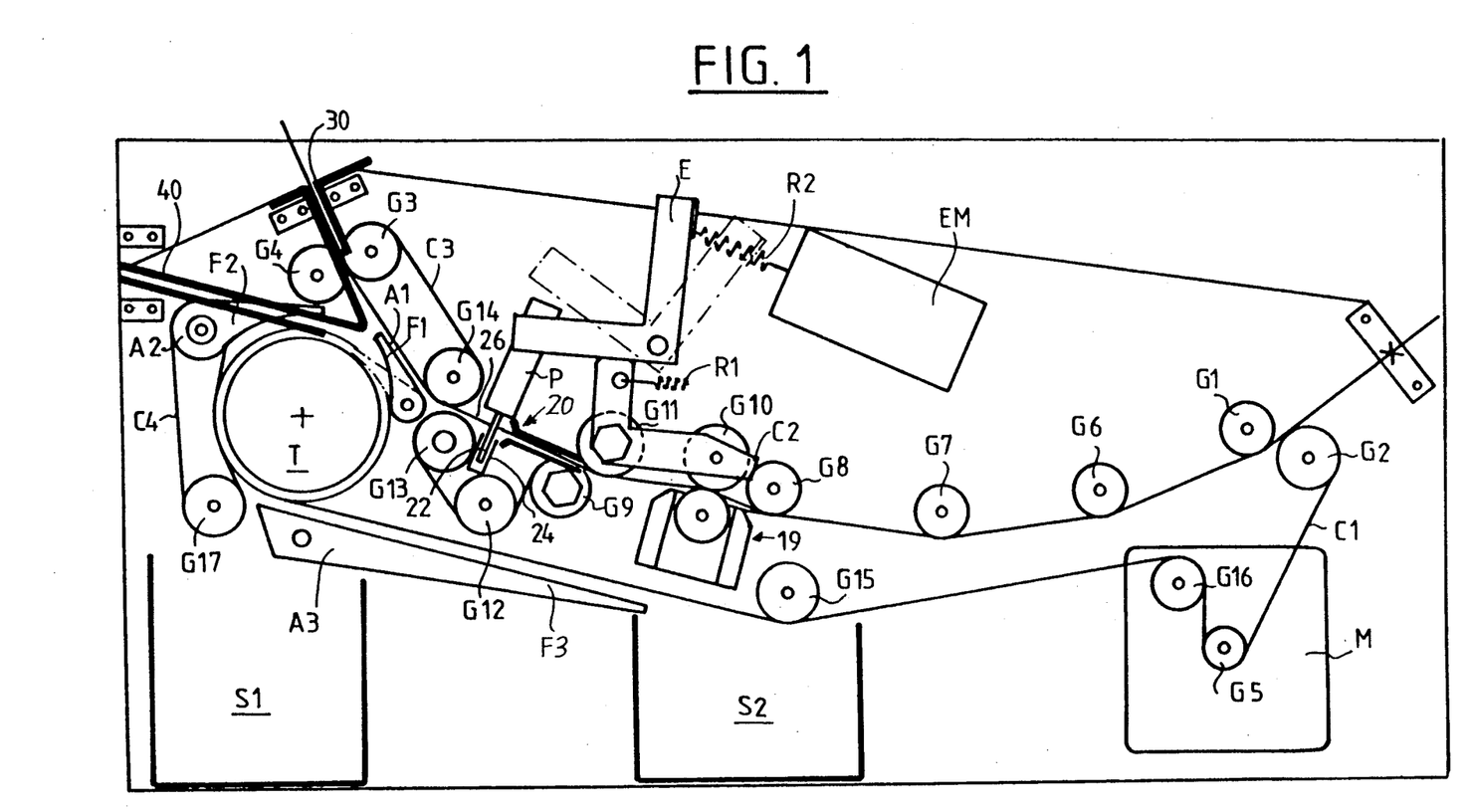
FIG. 1 is a diagrammatic side view of a processing device according to the invention.

The device shown diagrammatically in FIG. 1 is intended more particularly for the processing of an air transport ticket having a magnetic track. Such processing can involve a magnetic reading and/or a magnetic recording, followed by a separation of the portions of the ticket relative to the precut ticket, according to the content of the readable information on the portions.

Figure 2:
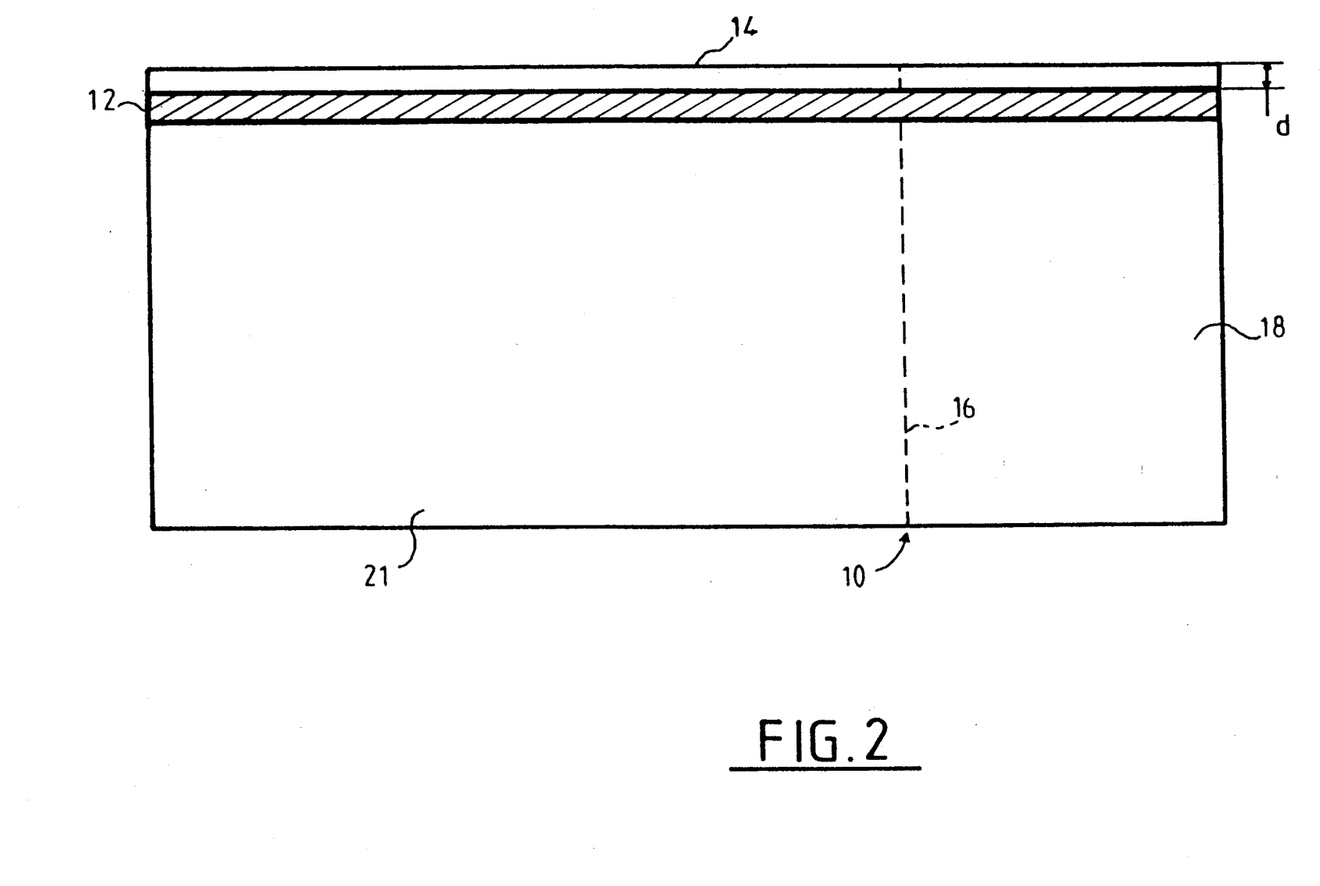
FIG. 2 shows an example of an air transport ticket processed by the said device according to the invention.

In practice, as shown in FIG. 2, the air transport ticket 10 of general rectangular form comprises a magnetic track 12 extending longitudinally on the ticket at a predetermined distance from one longitudinal edge 14 of the ticket.

According to a preferred embodiment of the invention, the ticket has weakening lines 16 corresponding to the cutout and division format of a portion 18, called a boarding card, and a portion 21, called a flight coupon.

The portion 18 contains magnetic information relating to the boarding of the passenger. This portion 18 is intended, after processing, to be directed towards an issuing station, which will be described hereinafter, in order to be supplied to the passenger who will keep it for possible subsequent checking.

The portion 21 contains information relating to the commercial and financial characteristics of the transport service. This portion 21, functioning as a payment coupon, is intended, after processing to be directed towards the storage receptacle which is located inside the device and which will be described later, in order to be stored and subsequently recovered by the airline company involved in said service.

The width of the precut ticket 10 is, for example, 82 millimeters and its length is 187 millimeters or 203 millimeters. In terms of a length of 187 millimeters, the portion 18 has a length of 55 millimeters and the portion 21 a length of 132 millimeters.

The distance d between the magnetic track and the longitudinal edge 14 is of the order of 4 millimeters, with an acceptable absolute error of the order of 0.13 millimeters.

Of course, the dimensions of the ticket and the number of portions are given here for explanatory purposes and in a non-limiting way. In practice, the dimensions of the precut ticket and the number of portions can be different. Furthermore, the device can process a transport ticket without any precut portion. It can also process only the boarding-card portion, in order to validate it a second time, if necessary (for example when passengers are being reintroduced into the aircraft after they have been taken off it prematurely because of a bomb warning).

Referring once again to FIG. 1, the ticket follows an internal path in the device between a ticket insertion input defined by two rollers G1 and G2 and a ticket issuing output defined by two rollers G3 and G4.

The ticket is driven along the internal path by means of a belt C1 wound in a closed circuit. The belt C1, after passing over a roller G5 driven by a motor M of the stepping type, passes between the rollers G1 and G2 inclined slightly relative to one another to ensure that the ticket is grasped.

The belt C1 then passes over the rollers G6, G7 and G8 located at a distance substantially equal to 50 millimeters from one another, to allow a document of such a length to be driven. It then passes through a magnetic reading/writing device 19 which will be described later, at the same time being tensioned between the rollers G8 and G9.

A belt C2 wound in a closed circuit round the rollers G10 and G11 drives the ticket in interaction with the magnetic reading/writing heads which will be described in more detail later.

The roller G10 is mounted pivotably between two positions by means of an elastic return R1. There is a first position, called the lowered position, in which the roller G10 interacts frictionally with the heads of the reading/writing station, in order to carry out magnetic reading/writing on the ticket. On the other hand, there is a second position, called the raised position, in which the roller G10 does not interact with said magnetic reading/writing heads and in which the belt C1 drives the ticket so processed towards the cutting-out station which will be described later.

Thus, associated with each reading head is a mechanical assembly C2, G10 and G11 ensuring respectively that the ticket is pressed against each of the heads.

In an alternative version of the invention, each mechanical assembly C2, G10 and G11 can be replaced by a single pressure roller mounted pivotably between a first position, in which the roller presses the ticket against the reading/writing head associated with the said roller and a second position, in which the roller no longer interacts with the corresponding reading/writing head.

The drive of the belt C1 is such that it allows several to-and-fro movements in front of the reading station 19.

The belt C1 is subsequently deflected by the rollers G12 and G13 in order to allow the insertion of a cutting-out station 20.

The cutting-out station 20 with an electromagnetic guillotine comprises an electromagnet EM having a plunger P equipped with a bracket E which supports the cutting-out piece 22 of the guillotine. The cutting-out piece 22 has a blunt edge interacting with a stock 24 possessing a central slit, in which the cutting-out piece 22 bears. An elastic return R2 attached between the electromagnet EM on the bracket E allows the rotation of the bracket E and the return of the cutting-out piece 22 into a normal raised position (in FIG. 1, the piece 22 is shown in the cutting-out position).

The cutting-out piece 22, by means of its blunt edge, separates the portions along their respective weakening lines. A separation of the portions, rather than a cutting-out of the said portions, therefore takes place here.

At the reading/writing device and at the cutting-out station, there are detectors (not shown) locating the weakening lines of the portions of the ticket. An electronic control unit (not shown) processes the signals coming from the detectors, in order to control the stepping motor M.

Once cutting out has been completed on the portions in question, these are guided towards the outputs which will be described later, and a new ticket can be inserted into the device.

Downstream of the cutting-out station 20, the belt C1 winds round the switch A1 equipped with a fork F1 mounted pivotably between two positions.

In a first position, the fork F1 directs one of the portions of the ticket, namely the boarding-card portion, towards the issuing station 30. The switch A1 interacts with the belt C3 wound in a closed circuit round the rollers G14 and G3 which are mounted idly. A guide channel ensures, in interaction with the rollers G3 and G4, that the portion of the ticket is guided outwards.

In a second position, the fork F1 directs the other portion of the ticket, namely the flight-coupon portion, towards an additional output. The switch A1 interacts with a drum T, about which the belt C1 winds in order to convey the said flight-coupon portion towards an output assigned to it according to the content of the readable information on said portion. Subsequently, the belt C1 passes over the rollers G15 and G16 and the driving roller G5.

There are several possible outputs for the flight coupon:
an additional output towards the outside 40;
an output towards a first storage receptacle located inside the device S1; and
an output towards a second storage receptacle located inside the device S2.

The travel of the flight-coupon portion towards the additional output 40 or towards the receptacles S1 or S2 is obtained as a result of the interaction of the drum T and a switch A2 equipped with a belt C4 winding in a closed circuit round a roller G17 and a fork F2. The fork F2 is mounted pivotably according to two positions:
a first position for directing the portion towards the output 40, and
a second position for directing the portion towards the receptacles S1 or S2.

A third switch A3 equipped with an elongated fork F3 mounted pivotably according to two positions ensures that the portion is guided towards the receptacle S1 or towards the receptacle S2.

The switches A1, S2 and A3 are controlled by the electronic control unit in response to the signals supplied by the detectors and in response to the content of the readable information on the portions of the ticket.

As mentioned previously, each ticket has the magnetic track 12; the track on the ticket portion 18 contains magnetic information relating to boarding of the passenger (the boarding pass), and the track on the ticket portion 21 contains magnetic information relating to the commercial and financial information of the airline (the flight coupon). In response to the magnetic information on the ticket, the boarding pass is directed toward the issuing station 30, and the flight coupon is directed toward the additional output, which can be the output 40 to the outside, or the first or second storage receptacles S1 or S2 on the inside of the device. As mentioned previously, the commercial and financial information on the flight coupon data track can include information relating to any of several airline companies; in addition, a flight can have no stops or one or more stops, and this information also can be contained on the magnetic data track on the flight coupon. The information on the flight coupon is therefore used in operating the device to direct the flight coupon either to the output 40 or to the storage receptacles S1 or S2.

Figure 3:
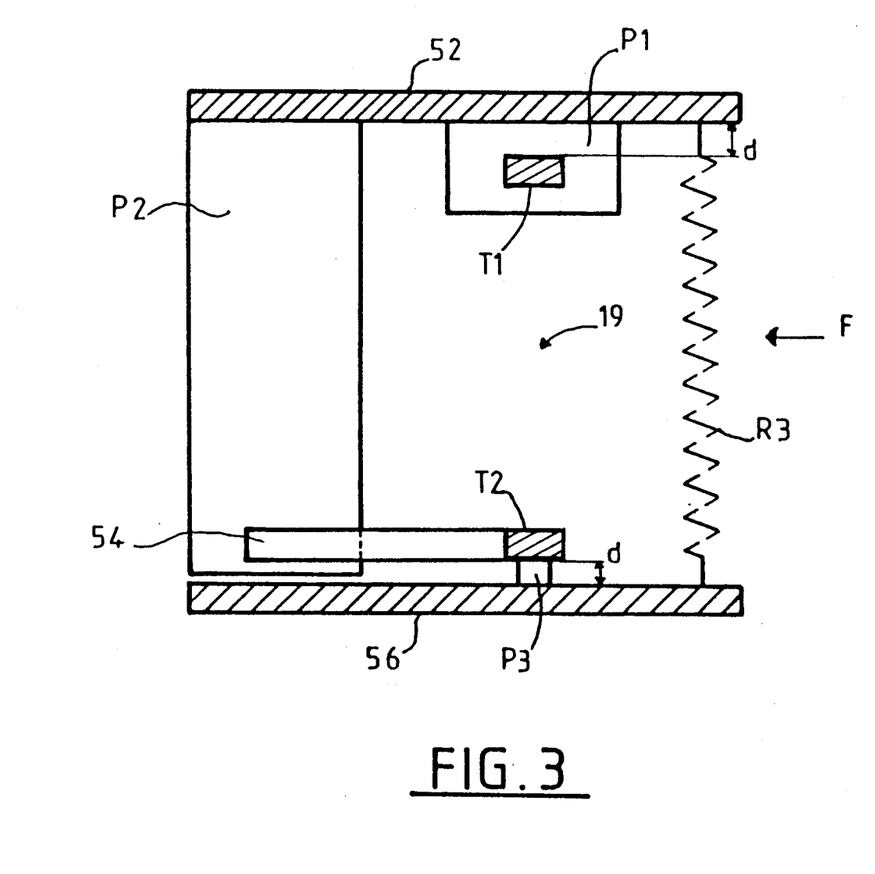
FIG. 3 is a diagrammatic top view showing the positioning of the two reading/writing heads according to the invention.

Reference is now made to FIG. 3 which illustrates in detail the magnetic reading/writing heads of the reading/writing station.

A magnetic reading/writing head T1 is mounted on a support P1 arranged transversely relative to the internal path of the ticket. This support P1 is fixed to a reference plate 52 fastened parallel to the said path on the stand (not shown) of the device.

The longitudinal edge 14 of the ticket, located at a distance d from the magnetic track, is intended to bear on the said plate in order to ensure a better guidance of the ticket in front of the reading head T1. Moreover, the reading head T1 is arranged at a distance d from the reference plate 52, to allow a correct reading of the magnetic track. The arrow F indicates the direction of run of the ticket in front of the head T1.

When the magnetic track extends longitudinally on the ticket in an asymmetric manner and when the ticket is inserted in the wrong direction, that is to say the direction in which the longitudinal edge 14 does not bear on the reference plate 52, the reading head T1 can no longer carry out a correct reading of the magnetic track.

To overcome this problem, there is an additional magnetic reading/writing head T2 mounted on a flexible frame 54 arranged parallel to the internal path of the ticket. The frame 54 consists of two flexible blades which are fastened to an additional support P2 fixed to the reference plate 52 and arranged transversely relative to the internal path of the ticket. The frame 54 is fixed by means of a support P3 to a flap 56 mounted in a floating manner parallel to the reference plate 52. The head T2 is located on the flexible frame 54 at a distance d from the flap 56 mounted in a floating manner on the stand of the device by means of an elastic return R3.

The flap 56 ensures the guidance of the ticket by serving as a rest for the longitudinal edge 14 of the ticket. This flap 56 thus allows a correct reading of the magnetic track, despite an incorrect insertion of the ticket and whatever width of the said ticket.

The control of the head T2 in relation to the edge 14 of the ticket takes place correctly as a result of the flexibility of the frame 54 on which the head T2 is mounted. This control becomes necessary because the width tolerance of the ticket ($\pm 0.13$ mm) is greater than the acceptable accuracy of the magnetic reading/writing ($\pm 0.1$ mm).

The device according to the invention thus comprises two reading assemblies which are arranged in the path of the ticket, to allow the processing of the magnetic information contained on the magnetic track, whatever the direction of insertion of the ticket (right-hand or left-hand track).

It is also seen that the transport ticket is never accessible from outside, thus giving the device security of use.

We claim:

1. Apparatus for the processing of a magnetic-track ticket which has portions thereof provided with a required cut-out and division format and which has weakening lines corresponding to said portions of the ticket, in which the magnetic track information is contained on each of said portions of the ticket, said apparatus comprising:

a ticket insertion station;
   a magnetic ticket reading/writing station;
   a ticket issuing station comprising a ticket output;
   an internal path extending from the insertion station to the issuing station;
   at least one additional ticket output;
   means for driving said ticket along said path, the driving means comprising a plurality of rollers, at least one of which is a driving roller, and a closed-circuit belt wound in a closed loop around said rollers;
   a drum about which the ticket issuing station and said additional ticket output interact, said closed-circuit belt being wound around the drum and extending continuously from the insertion station past the reading/writing station and extending at least as far as said drum;
   a cutting-out station between the reading/writing station and the drum, in which the continuous closed-circuit belt travels from the reading/writing station and is thereafter deflected at the cutting-out station to permit a cutting device to sever the ticket into separate cut-out ticket portions, prior to the belt traveling toward the drum; and
   a movable switch adjacent the drum for directing the separate cut-out ticket portions from the drum and the closed-circuit belt engaged therewith towards the issuing station and towards the additional output depending upon the content of the information readable on the said ticket portions by the reading/writing station.

2. Apparatus according to claim 1, including at least one storage receptacle to which the additional output is coupled, and wherein the ticket is a transport ticket which comprises at least a first boarding card portion intended to be directed towards the issuing station and containing magnetic information related to the boarding of the passenger, and a second flight coupon portion intended to be directed towards the storage receptacle and containing information relating to the commercial and financial characteristics of the transport service.

3. Apparatus according to claim 2, wherein the ticket storage receptacle is located internally of the apparatus.

4. Apparatus according to claim 3, wherein the ticket storage receptacle is sub-divided into two parts to receive the ticket portions according to the content of the readable information on said portions.

5. Apparatus according to claim 1, wherein the ticket is a transport ticket which is of generally rectangular form and which comprises a magnetic track extending longitudinally on the ticket at a predetermined distance from one longitudinal edge of the ticket.

6. Apparatus according to claim 5, wherein the magnetic reading/writing station comprises, on one side, a magnetic reading/writing head, a support on which the magnetic reading/writing head is mounted arranged transversely relatively to the said internal path, a reference plate fastened parallel to the said path and to which said support is fixed, said reference plate being so positioned as for the longitudinal edge of the ticket located at a predetermined distance from the magnetic track to bear thereon, the reading head being located at the said predetermined distance from the plate for correct reading of the magnetic track, and, on the other side, a roller mounted idly opposite the reading/writing head and arranged frictionally to interact with the head by means of a resilient bias in order to ensure that the ticket is pressed against the said head.

7. Apparatus according to claim 6, wherein the magnetic reading/writing station comprises, on one side, a flap mounted in a floating manner parallel to the reference plate, a flexible frame arranged parallel to the internal path of the ticket, said frame being fixed to said flap, and an additional magnetic reading/writing head mounted on said flexible frame, the longitudinal edge of the ticket located at a predetermined distance bearing on the said flap whilst the additional head is located at the said predetermined distance from the flap to allow a correct reading of the magnetic track, whatever the direction of insertion of the ticket, and, on the other side, an additional roller mounted idly opposite the additional reading/writing head and biased to ensure that the ticket is pressed against the said additional head.

8. Apparatus according to claim 1, wherein each ticket has a common face engaged solely by the closed-circuit belt, and the rollers are spaced apart for contact with a common opposite face of each ticket traveling along the belt in order to reliably advance said ticket.

9. Apparatus according to claim 1, including a detector for detecting said portions of the ticket, and wherein the cutting-out station comprises an electromagnetic guillotine controlled in conjunction with said detector and comprising an electromagnet having a plunger equipped with a bracket supporting the guillotine cutter piece, an axle upon which said bracket is rotatably mounted, and the elastic return means for said axle.

10. Apparatus according to claim 9, wherein the ticket-portion detector is adapted to locate the predetermined weakening lines on the ticket.

11. Apparatus according to claim 1, including a single motor of the stepping type connected for driving the closed-circuit belt.

12. Apparatus according to claim 1 including at least one internal receptacle separate from the additional ticket output, and in which the closed-circuit belt directs a separated ticket portion either to the additional output or to the internal receptacle depending upon the magnetic information readable by the reading/writing station.

13. Apparatus according to claim 1 in which the closed-circuit belt is also part of an ancillary drive, and including a single drive motor for moving the closed-circuit belt past the reading/writing station, the cutting-out station, around the drum and to the ancillary drive.

14. Apparatus for the processing of a magnetic-track ticket which has portions thereof provided with a required cut-out and division format and which has weakening lines corresponding to said portions of the ticket, in which the magnetic track information is contained on each of said portions of the ticket, said apparatus comprising:

a ticket insertion station;
   a magnetic ticket reading/writing station;

a ticket issuing station comprising a ticket output;
an internal path extending from the insertion station to the issuing station;
at least one additional ticket output;
means for driving said ticket along said path, the drive means being at least partially defined by a plurality of rollers, at least one of which is a driving roller, and a closed-circuit belt wound in a closed loop around said rollers;
a drum about which the ticket issuing station and said additional ticket output interact, said closed-circuit belt being wound around the drum and extending continuously from the insertion station past the reading/writing station and extending at least as far as said drum; and
a cutting-out station between the reading/writing station and the drum, in which the ticket is separated into portions at the cutting-out station, and including a movable first switch adjacent the drum whereby the separate cut-out ticket portions are directed towards the issuing station and towards the additional output depending upon the content of the information readable from the said ticket portions by the reading/writing station to control movement of the first switch;
including at least one storage receptacle to which the additional output is coupled, and a further movable second switch adjacent the drum whereby the ticket portion directed toward the additional output either passes to the additional output or is directed toward the storage receptacle depending upon the content of the information readable from the ticket portion by the reading/writing station to control movement of the second switch, and wherein the ticket is a transport ticket with comprises at least a first boarding card portion directed towards the issuing station and containing magnetic information related to the boarding of a passenger, and a second flight coupon portion directed towards the storage receptacle and containing information relating to the commercial and financial characteristics of the service.

15. Apparatus according to claim 14, wherein the ticket storage receptacle is located internally of the apparatus.

16. Apparatus according to claim 14, wherein the ticket storage receptacle is sub-divided into two parts to receive the ticket portions according to the content of the readable information on said portions.

17. Apparatus according to claim 14, wherein the ticket is a transport ticket which is of generally rectangular form and which comprises a magnetic track extending longitudinally on the ticket at a predetermined distance from one longitudinal edge of the ticket.

18. Apparatus according to claim 17, wherein the magnetic reading/writing station comprises, on one side, a magnetic reading/writing head, a support on which the magnetic reading/writing head is mounted arranged transversely relatively to the said internal path, a reference plate fastened parallel to the said path and to which said support is fixed, said reference plate being so positioned as for the longitudinal edge of the ticket located at a predetermined distance from the magnetic track to bear thereon, the reading head being located at the said predetermined distance from the plate for correct reading of the magnetic track, and, on the other side, a roller mounted idly opposite the reading/writing head and arranged frictionally to interact with the head by means of a resilient bias in order to ensure that the ticket is pressed against the said head.

19. Apparatus according to claim 18, wherein the magnetic reading/writing station comprises, on one side, a flap mounted in a floating manner parallel to the reference plate, a flexible frame arranged parallel to the internal path of the ticket, said frame being fixed to said flap, and an additional magnetic reading/writing head mounted on said flexible frame, the longitudinal edge of the ticket located at a predetermined distance bearing on the said flap whilst the additional head is located at the said predetermined distance from the flap to allow a correct reading of the magnetic track, whatever the direction of insertion of the ticket, and, on the other side, an additional roller mounted idly opposite the additional reading/writing head and biased to ensure that the ticket is pressed against the said additional head.

20. Apparatus according to claim 14, wherein the ticket has a length of between 52 mm and 250 mm, and the rollers are spaced apart by a distance substantially equal to 50 mm in order reliably to advance said ticket.

21. Apparatus according to claim 14, including a detector for detecting said portions of the ticket, wherein the cutting-out station comprises an electromagnetic guillotine controlled in conjunction with said detector and comprising an electromagnet having a plunger equipped with a bracket supporting the guillotine cutter piece, an axle upon which said bracket is rotatably mounted, and elastic return means for said axle.

22. Apparatus according to claim 21, wherein the ticket-portion detector is adapted to locate the predetermined weakening lines on the ticket.

23. Apparatus according to claim 14, including switching means coupled to the ticket outputs and controlled in conjunction with the magnetic reading/writing station for directing each portion of the ticket towards its respective output.

24. Apparatus according to claim 14, including a single motor of the stepping type connected for driving the belt.

25. Apparatus for the processing of a magnetic-track ticket which has portions thereof provided with a required cut-out and division format, and which has weakening lines corresponding to said portions of the ticket, in which the magnetic track information is contained on each of said portions of the ticket, said apparatus comprising:
a ticket insertion station;
a magnetic ticket reading/writing station;
a ticket issuing station comprising a ticket output;
an internal path extending from the insertion station to the issuing station;
at least one additional ticket output;
a single belt means for driving said ticket along said path, the driving means comprising a plurality of rollers, at least one of which is a driving roller, and a closed-circuit belt wound in a closed loop around said rollers;
a drum about which the ticket issuing station and said additional ticket output interact, said closed-loop belt being wound around the drum and extending continuously from the insertion station, past the reading/writing station, and at least as far as said drum, the closed-circuit belt engaging a common face of the tickets while the rollers engage an opposite common face of the tickets; and a cutting-out station between the reading/writing station and the drum, in which the continuous closed-circuit belt travels from the reading/writing station and is thereafter deflected at the cutting-out station, to permit a cutting device to sever the ticket into separate cut-out ticket portions, prior to traveling toward the drum, separate cut-out ticket portions being directed by the closed-circuit belt toward the issuing station and toward the additional output, depending upon the content of the information readable on said ticket portions by the reading/writing station;

the closed-circuit belt transporting the cut-out ticket portions to the ticket issuing station or to said additional ticket output depending upon the position of a deflector controlled by said readable information.

26. Apparatus according to claim 25 in which the closed-circuit belt is part of an ancillary drive, and including a ticket receptacle separate from the additional ticket output, and in which the closed-circuit belt directs a separated ticket portion either to the additional output or to the receptacle depending upon the magnetic information readable by the reading/writing station.

27. Apparatus according to claim 26 including a single drive motor for moving the closed-circuit belt past the reading/writing station, the cutting out station, around the drum and to the ancillary drive.

* * * * *

UNITED STATES PATENT AND TRADEMARK OFFICE
CERTIFICATE OF CORRECTION

PATENT NO. : 5,168,150
DATED : December 1, 1992
INVENTOR(S) : Thierry Plouzennec; Bernard Bluteau It is certified that error appears in the above-identified patent and that said Letters Patent is hereby corrected as shown below:

On the title page:

[56] Referencess Cited, FOREIGN PATENT DOCUMENTS, change
"60-00232  7/1985" to
-- 85-00232  7/1985  Japan --.
Abstract, line 1, after "processing" insert -- of --.

Column 1, line 24, change "round" to -- around --.
Column 1, line 53, change "round" to -- around --.
Column 2, line 54, after "head" insert a period.
Column 4, line 33, change "round" to -- around --.
Column 5, line 27, change "round" to -- around --.
Column 5, line 51, change "round" to -- around --.

Column 9, line 35, after "ticket" change "with" to
-- which --.

Signed and Sealed this

Fourteenth Day of December, 1993

Attest:

BRUCE LEHMAN

*Attesting Officer*    Commissioner of Patents and Trademarks